United States Patent
Wan et al.

(10) Patent No.: US 8,413,317 B1
(45) Date of Patent: Apr. 9, 2013

(54) METHOD FOR FABRICATING A STRUCTURE FOR A MICROELECTRIC DEVICE

(75) Inventors: Dujiang Wan, Fremont, CA (US); Hai Sun, Milpitas, CA (US); Ge Yi, San Ramon, CA (US); Wei Gao, Fremont, CA (US); Hong Zhang, Fremont, CA (US); Guanghong Luo, Fremont, CA (US); Yunjun Tang, Pleasanton, CA (US); Tiffany Yun Wen Jiang, San Francisco, CA (US); Zhigang Zhou, San Ramon, CA (US); Wencheng Su, Cupertino, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 138 days.

(21) Appl. No.: 12/945,681

(22) Filed: Nov. 12, 2010

(51) Int. Cl.
*G11B 5/127* (2006.01)
*H04R 31/00* (2006.01)

(52) U.S. Cl. ............ 29/603.13; 29/603.11; 29/603.14; 29/603.15; 29/603.16; 29/603.18; 216/22; 216/39; 216/41; 216/48; 216/65; 360/125.02; 360/125.03; 360/125.13; 360/125.3; 360/125.33; 451/5; 451/41

(58) Field of Classification Search .............. 29/603.11, 29/603.13–603.17, 605, 606; 216/22, 39, 216/41, 48, 65; 360/125.02, 125.03, 125.13, 360/125.3, 125.33; 451/5, 41
See application file for complete search history.

(56) References Cited

U.S. PATENT DOCUMENTS

| | | | |
|---|---|---|---|
| 6,452,742 B1 | 9/2002 | Crue et al. | |
| 6,540,928 B1 | 4/2003 | Kobrin et al. | |
| 6,547,975 B1 | 4/2003 | Kobrin | |
| 6,566,280 B1 | 5/2003 | Meagley et al. | |
| 6,602,794 B1 | 8/2003 | Kye | |
| 6,870,712 B2 | 3/2005 | Chen et al. | |
| 6,972,928 B2 | 12/2005 | Snyder et al. | |
| 6,989,971 B2 | 1/2006 | Lin et al. | |
| 7,024,756 B2 | 4/2006 | Le et al. | |
| 7,108,796 B2 | 9/2006 | Bergevin et al. | |
| 7,120,988 B2 | 10/2006 | Le et al. | |
| 7,132,221 B2 * | 11/2006 | Chen et al. | 430/296 |
| 7,275,306 B2 | 10/2007 | Allen et al. | |
| 7,396,768 B2 | 7/2008 | Feng et al. | |
| 7,444,740 B1 | 11/2008 | Chung et al. | |
| 7,587,811 B2 | 9/2009 | Balamane et al. | |
| 2005/0058952 A1 | 3/2005 | Chen et al. | |
| 2009/0053651 A1 | 2/2009 | Hatakeyama et al. | |
| 2010/0078406 A1 | 4/2010 | Guthrie et al. | |
| 2010/0112486 A1 | 5/2010 | Zhang et al. | |

* cited by examiner

*Primary Examiner* — Paul D Kim

(57) ABSTRACT

A method and system for fabricating a microelectric device are described. A write pole of an energy assisted magnetic recording head or a capacitor might be fabricated. The method includes depositing a resist film and curing the resist film at a temperature of at least 180 degrees centigrade. A cured resist film capable of supporting a line having an aspect ratio of at least ten is thus provided. A portion of the cured resist film is removed. A remaining portion of the resist film forms the line. An insulating or nonmagnetic layer is deposited after formation of the line. The line is removed to provide a trench in the insulating or nonmagnetic layer. The trench has a height and a width. The height divided by the width corresponds to the aspect ratio. At least part of the structure is provided in the trench.

14 Claims, 13 Drawing Sheets

METHOD FOR FABRICATING A STRUCTURE FOR A MICROELECTRIC DEVICE

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, a coil 24, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30 using the conventional coil 24.

The trend in magnetic recording continues to higher recording densities. Magnetic recording densities have already reached 500-600 Gb/in$^2$ using traditional perpendicular magnetic recording technology. To further increase magnetic recording density, EAMR is used. At such high densities, a conventional pole 30 having a high aspect ratio is desired for an EAMR head. For example, the width, w, of the conventional pole 30 is desired to be on the order of one hundred nanometers. The height, h, of the conventional pole 30 is desired to be approximately 1.2 microns. Thus, the aspect ratio (h/w) of the conventional pole may be desired to be large. However, such an aspect ratio is difficult to achieve with conventional processing. Stated differently, the actual aspect ratio of the pole conventional 30 is typically much less than 10.

Accordingly, what is needed is a system and method for improving performance and reliability of an EAMR transducer.

SUMMARY

A method and system for fabricating a microelectric device are described. A write pole of an energy assisted magnetic recording head or a capacitor might be fabricated. The method includes depositing a resist film and curing the resist film at a temperature of at least 180 degrees centigrade. A cured resist film capable of supporting a line having an aspect ratio of at least ten is thus provided. A portion of the cured resist film is removed. A remaining portion of the resist film forms the line. An insulating or nonmagnetic layer is deposited after formation of the line. The line is removed to provide a trench in the insulating or nonmagnetic layer. The trench has a height and a width. The height divided by the width corresponds to the aspect ratio. At least part of the structure is provided in the trench.

DETAILED DESCRIPTION OF THE PREFERRED EMBODIMENTS

Figure 1:
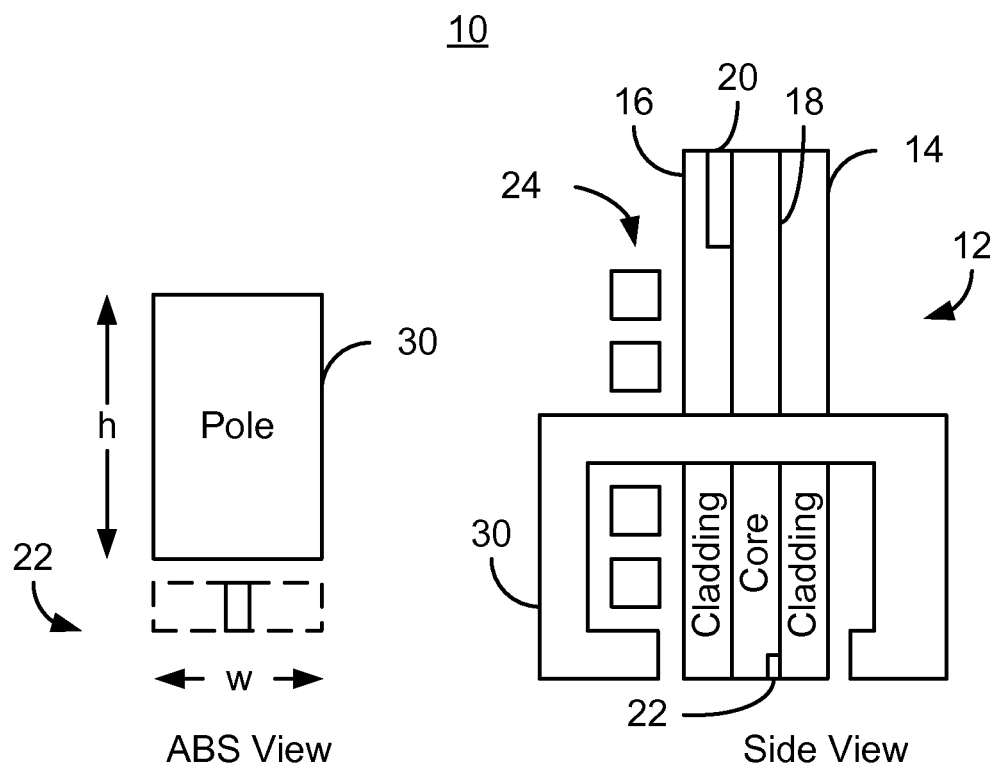
FIG. 1 depicts a side view of a conventional EAMR transducer.
Figure 2:
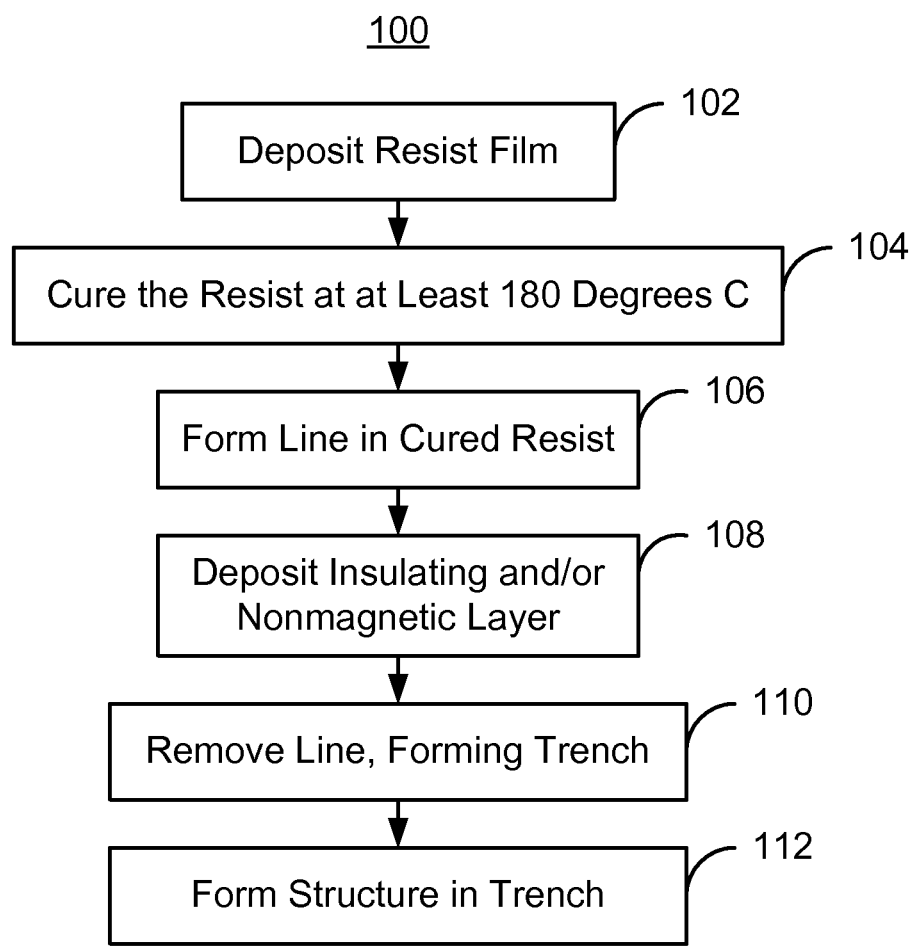
FIG. 2 is a flow chart depicting an exemplary embodiment of a method for fabricating a microelectric device.

FIG. 2 is a flow chart depicting an exemplary embodiment of a method 100 for fabricating a structure in a microelectric device. For example, the structure might be a capacitor or a pole in a magnetic recording transducer. The method 100 is described in the context of a fabricating a single device. However, multiple devices are generally fabricated in parallel. For simplicity, some steps may be omitted and/or combined. The method 100 also may commence after formation of other portions of the microelectric device. The method 100 and system are also described in the context of particular layers. However, in some embodiments, such layers may include multiple sub-layers. In one embodiment, the method 100 commences after formation of the underlayer(s) on which the structure is to reside. The method may also be used to fabricate the structure on a sloped surface. For example, in some embodiments, the slope of the surface on which the structure is manufactured has a slope of at least ten degrees.

A resist film is deposited, via step 102. For example, the resist film may be spun on or coated. In some embodiments, the resist film is actually a bilayer film. For example, a bilayer of polydimethylglutarimide (PMGI) and photoresist may be used. In other embodiments, another number of layers might be used. For example, a single layer of PMGI or a trilayer might be used. The resist film is generally self-leveling and removable from the layer on which it is deposited. The resist film is desired to be self-leveling in order to be deposited on the sloped surface, yet provide a substantially flat topology for photolithography. The resist film is desired to be removable from the underlying layer, for example via a wet etch and lift-off process. This allows a clean underlying surface to be used for fabrication of the structure, as described below.

The resist film is cured, via step 104. In some embodiments, the resist film is cured at a temperature of at least one hundred and eighty degrees centigrade. In some embodiments, the resist film is cured at a temperature of no more than two hundred forty degrees centigrade. A cured resist film is thus provided. The cured resist film capable of supporting a line having an aspect ratio of at least ten. In some embodiments, the aspect ratio of the line is at least twelve. Further, the line may be thin. In some embodiments, the line is not more than one hundred-twenty-five nanometers wide. In other embodiments, the line is not more than one hundred nanometers wide.

A portion of the cured resist film is removed, via step 106. Thus, a line is formed in the cured resist film. In some embodiments, the line is an iso-line. An insulating and/or nonmagnetic layer is deposited after the line is formed, via step 108. The insulating layer might include aluminum oxide, silicon dioxide, and/or some other dielectric. The nonmagnetic layer may be metal or insulating.

The line is then removed, via step 110. In some embodiments, some combination of a reactive ion etch (RIE), a wet etch, and some other removal process might be used. In general, the removal process is desired to leave the layer adjacent to the line substantially unaffected. As a result, a trench corresponding to the line is formed. Thus, the trench has a location and aspect ratio of the line. Stated differently, the height and width of the trench corresponds to the line.

At least a portion of the structure is provided in the trench, via step 112. Thus, a capacitor and/or pole may be formed in the trench. The structure Using the method 100, the main pole 158 may be fabricated. There may be fewer variations in the height of the pole. In particular, the second, touch CMP may cause lower variations in the pole height. As a result, the pole width is also subject to fewer variations. The reduced variations in pole height and width may be both within a single wafer and wafer to wafer. Consequently, performance of the pole 158 and its fabrication using the method 100 may be improved. Further, the method 100 may be extended to higher areal density magnetic recording devices. Thus, flexibility of the method 100 may be improved.

Thus, using the method 100, the structure may be formed. Because the structure is formed in a trench corresponding to the line, the structure may have a high aspect ratio. In particular, the structure may have an aspect ratio (height divided by width) that is at least ten. In some embodiments, the structure may have an aspect ratio that is greater than or equal to twelve.

Figure 3:
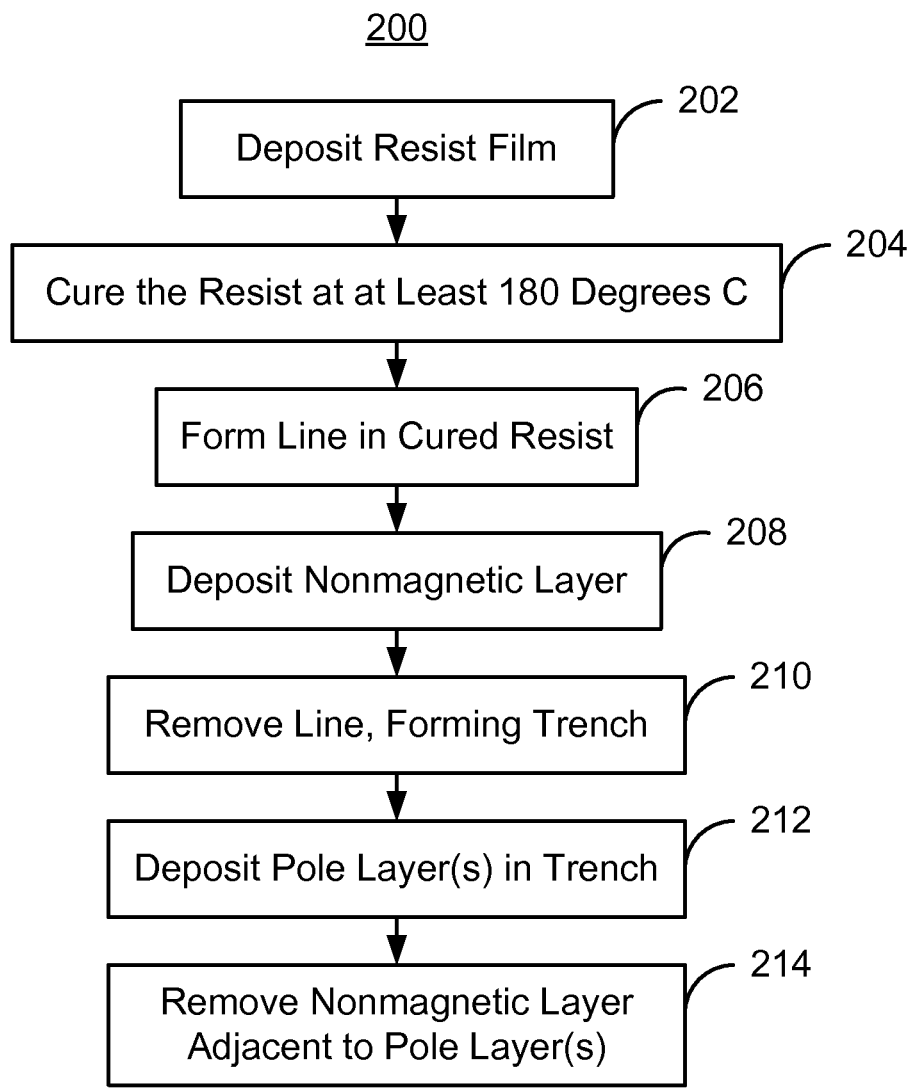
FIG. 3 is a flow chart depicting an exemplary embodiment of a method for fabricating a EAMR pole.

FIG. 3 is a flow chart depicting an exemplary embodiment of a method 200 for fabricating a pole for an EAMR transducer. The method 200 is described in the context of a fabricating a single pole. However, multiple transducers are generally fabricated in parallel. For simplicity, some steps may be omitted and/or combined. The method 200 and system are also described in the context of particular layers. However, in some embodiments, such layers may include multiple sublayers. In one embodiment, the method 200 commences after formation of the underlayer(s) on which the pole is to reside. For example, a seed layer may be deposited prior to the method 200. The method may also be used to fabricate the pole on a sloped surface. For example, in some embodiments, the slope of the surface on which the pole is manufactured has a slope of at least ten degrees. The method 200 may also be viewed as an application of the method 100.

A resist film is provided on an underlayer, via step 202. For example, the resist film may be spun on or coated. In some embodiments, the resist film is actually a bilayer film, such as a PMGI/photoresist bilayer. In other embodiments, another number of layers might be used. Further, other materials may be used. For example, a spin-on glass or other self leveling material may be used. The resist film is self-leveling and removable from the layer on which it is deposited.

The resist film is cured, via step 204. In some embodiments, the resist film is cured at a temperature of at least one hundred and eighty degrees centigrade. In some such embodiments, the temperature is at least two hundred degrees centigrade. In other embodiments, the resist film is cured at a temperature of no more than two hundred and forty degrees centigrade. A maximum of two hundred forty degrees centigrade may be desired to attempt to preclude damage to an underlying magnetoresistive sensor. A cured resist film capable of supporting a line having an aspect ratio of at least ten is thus provided. In some embodiments, the aspect ratio of the line is at least twelve.

A line is formed in the cured resist film, via step 206. Step 206 includes providing a mask covering part of the cured resist film and removing an exposed portion of the cured resist film. Thus, the line having the aspect ratio described above is formed. Further, the line may be thin. In some embodiments, the line is not more than one hundred-twenty-five nanometers wide. In other embodiments, the line is not more than one hundred nanometers wide. Further in some embodiments, the line may be at least 2.5 micrometers tall.

A nonmagnetic layer is deposited after the line is formed, via step 208. In some embodiments, the nonmagnetic layer is also insulating and may include materials such as aluminum oxide.

The line is then removed, via step 210. In some embodiments, a RIE may be used to remove the photoresist portion of the line, while a wet etch may be used to remove the PMGI portion of the line. As a result, a trench corresponding to the line is formed is formed in the nonmagnetic layer deposited in step 208. The trench has the location, height, and width of the trench corresponds to the line.

The pole layer(s) are deposited in the trench, via step 212. In some embodiments, one or more layers may be deposited. In other embodiments, a single layer may be deposited. The pole layer(s) include magnetic layers. In some embodiments, nonmagnetic layers might also be used.

The nonmagnetic layers adjacent to the pole are removed, via step 214. In some embodiments, all of the nonmagnetic material is removed. However, in other embodiments, only a portion of the nonmagnetic material is removed. Thus, a space is opened around the pole. Fabrication of the EAMR transducer may then be completed.

Figure 4:
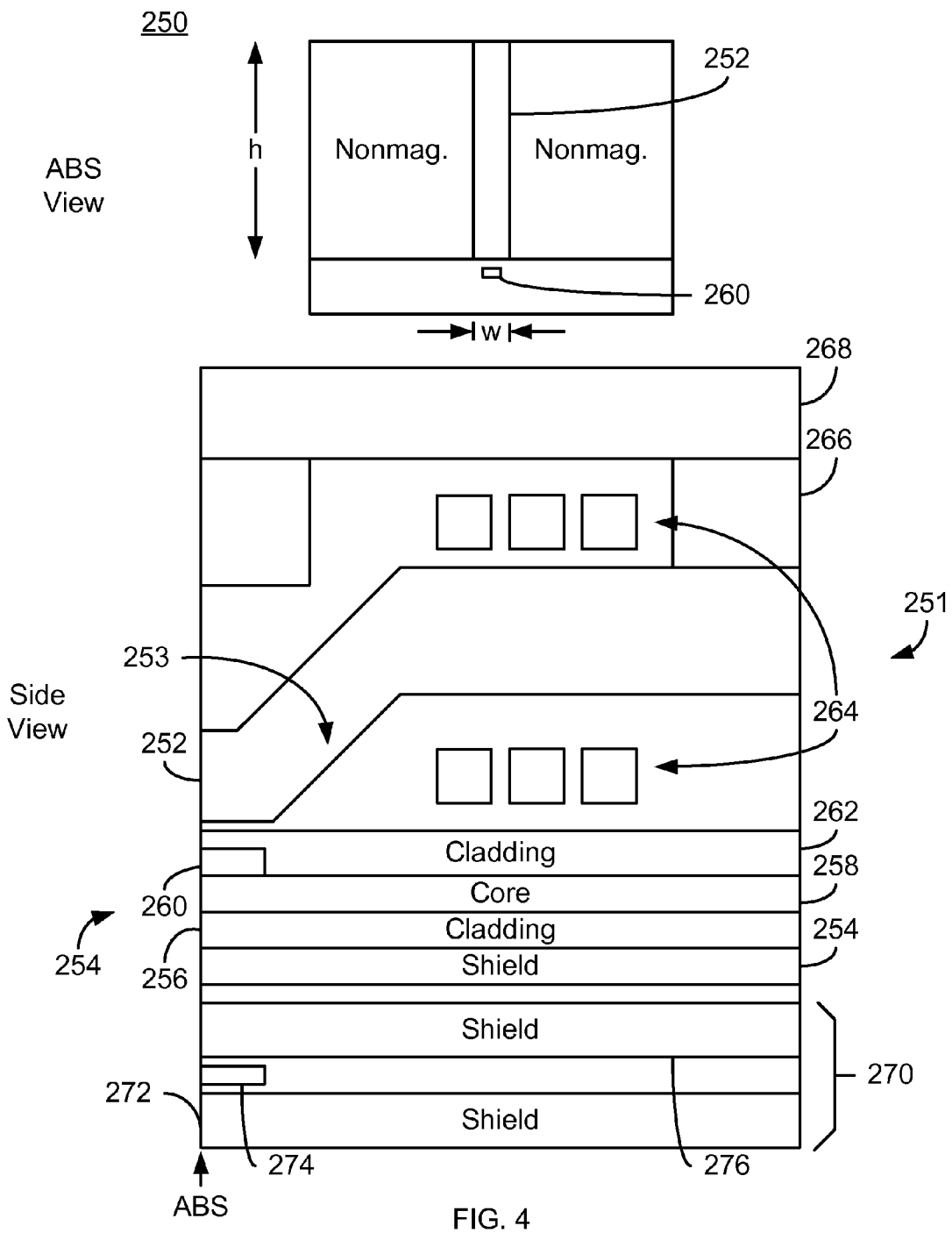
FIG. 4 is a diagram depicting an embodiment of an EAMR head.

FIG. 4 depicts an exemplary embodiment of an EAMR head 250 formed using the method 200. Both side and air-bearing surface (ABS) views are shown. For clarity, only a portion of the EAMR head 250 is shown in ABS view. In addition, FIG. 4 is not to scale. The EAMR head 250 includes a write transducer 251 and a read transducer 270. The read transducer 270 includes shields 272 and 276 as well as a read sensor 274. The read sensor 274 may be a giant magnetoresistive sensor, such as a tunneling magnetoresistive sensor. The shields 272 and 276 are typically high permeability shields. The write transducer 251 includes pole 252, waveguide 254, near-field transducer (NFT) 260, coil(s) 264, back pedestal 266, and top shield 268. In some embodiments, an additional shield 254 is also provided. The coil(s) 264 may be pancake coils or a solenoidal coil. The EAMR head 250 typically also includes a waveguide (not shown) that couples light in from a laser (not shown) for use in recording. The waveguide 254 typically includes core 256 and cladding 254 and 258. The NFT 260 is generally included in the EAMR head 250 and may be used to focus the energy from the laser onto the media (not shown).

The main pole 252 is formed using the method 200. As can be seen in FIG. 4, the pole 252 is formed on a sloped surface 253. Because the resist film is self leveling, the resist film may provide a flat surface. Thus, despite the underlying sloped surface 253, a desired surface for photolithography is provided. Consequently, the pole 252 is better able to be formed. Because the method 200 is used, the pole 252 may have a high aspect ratio. More specifically the pole height, h, divided by the width, w, may be greater than or equal to twelve. In some embodiments, the width, w, is less than or equal to one hundred nanometers. During curing, the resist film hardens into the cured resist film. The increase in hardness allows the line to be capable of undergoing subsequent processing to be formed from the cured resist film. The trench having the desired width and aspect ratio can be formed. Consequently, the pole 252 having the desired width and height may also be formed. Because the pole 252 has the desired geometry, the EAMR head 250 may have enhanced performance, particularly at higher magnetic recording densities.

Figure 5:
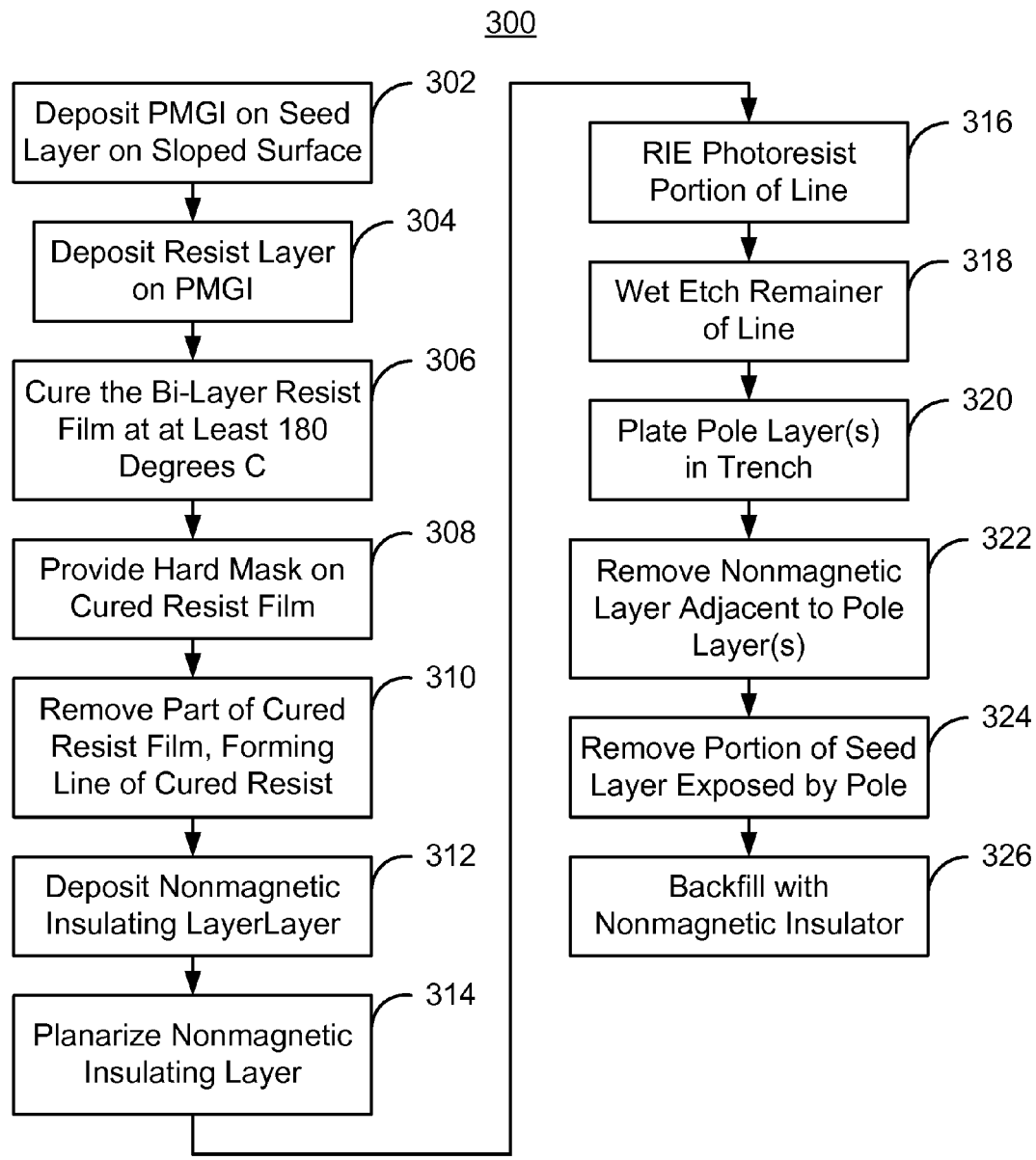
FIG. 5 is a flow chart depicting another exemplary embodiment of a method for fabricating a EAMR transducer.

FIG. 5 is a flow chart depicting another exemplary embodiment of a method 300 for fabricating an EAMR transducer. For simplicity, some steps may be omitted and/or combined. FIGS. 6-16 are diagrams depicting ABS views of an exemplary embodiment of a portion of an EAMR transducer 350 during fabrication. For clarity, FIGS. 6-16 are not to scale. The method 300 is described in the context of a fabricating a single transducer 350. However, multiple transducers are generally fabricated in parallel. The method 300 and transducer 350 are also described in the context of particular layers. However, in some embodiments, such layers may include multiple sub-layers. In one embodiment, the method 300 commences after formation of the underlayer(s) on which the pole is to reside. For example, a seed layer may be deposited prior to the method 300. The method may also be used to fabricate the pole on a sloped surface. For example, in some embodiments, the slope of the surface on which the pole is manufactured has a slope of at least ten degrees. The method 300 may also be viewed as an application of the method 100 and/or 200.

Figure 6:
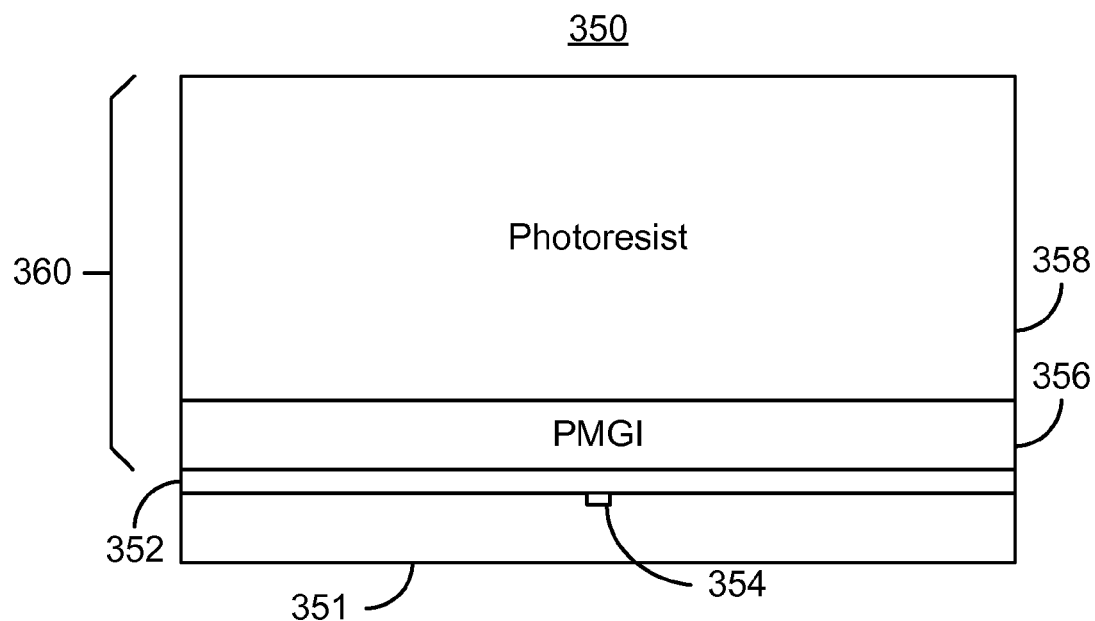
FIGS. 6-16 are diagrams depicting an exemplary embodiment of an EAMR head during fabrication.

A PMGI film is provided on an underlayer, via step 302. For example, the PMGI film may be deposited on a seed layer. A resist layer is deposited on the PMGI film, via step 204. For example, the PMGI film and the resist layer may be spun on or coated. Step 204 may include spin coating the resist layer. The PMGI film is removable from the seed layer using a wet etch. The resist layer is self-leveling. Thus, a bi-layer resist film is formed in steps 202 and 204. FIG. 6 depicts the transducer 350 after step 204 is performed. Thus, and insulating layer 351, seed layer 352, and NFT 354 are shown. A bi-layer resist structure 360 is formed from PMGI layer 356 and photoresist layer 358. In some embodiments, the bi-layer resist structure 260 is at least 2.5 micrometers tall. In some such embodiments, the PMGI layer 356 is as thick as possible. For example, the PMGI layer 356 may be at least 0.3 microns thick. In some such embodiments, the resist layer 358 may be 2.2 microns thick. However, in other embodiments, the PMGI layer 356 may have another thickness. Similarly, the bi-layer resist structure 260 and/or the photoresist layer 358 may have another thickness.

The bi-layer resist film 360 is cured, via step 306. In some embodiments, the bi-layer resist film 360 is cured at a temperature of at least one hundred and eighty degrees centigrade. In some such embodiments, the temperature is at least two hundred degrees centigrade. In other embodiments, the bi-layer resist film 360 is cured at a temperature of no more than two hundred and forty degrees centigrade. A maximum of two hundred forty degrees centigrade may be desired to attempt to preclude damage to an underlying magnetoresistive sensor. A cured bi-layer resist film 360 capable of supporting a line having an aspect ratio of at least ten is thus provided. In some embodiments, the aspect ratio of the line is at least twelve.

Figure 7:
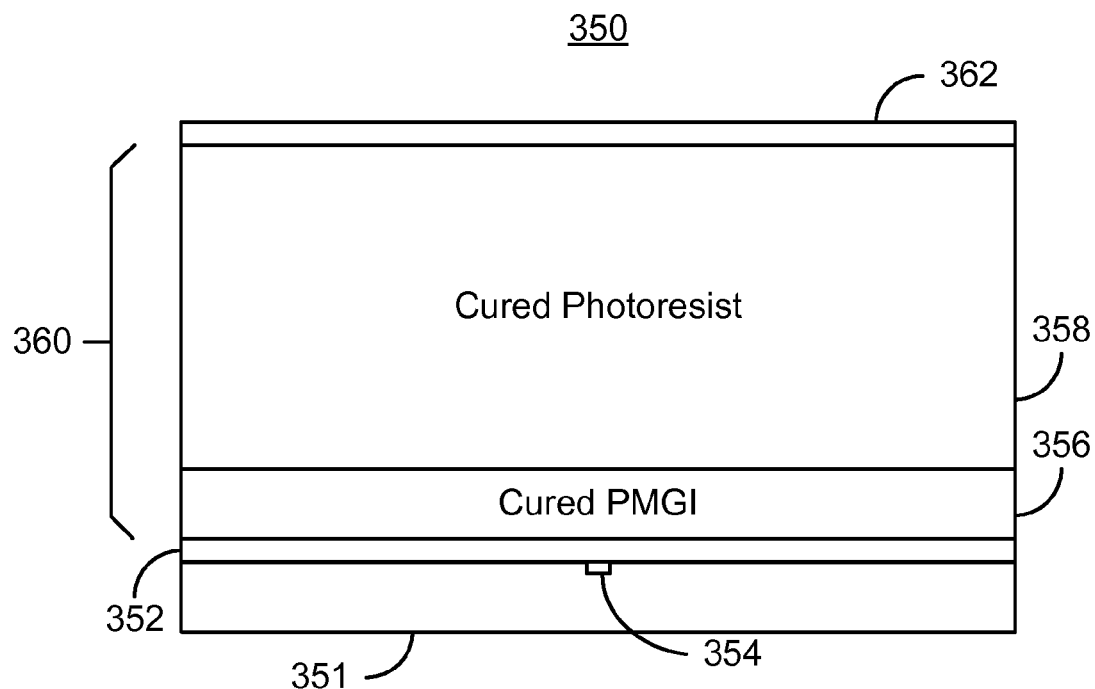
Figure 8:
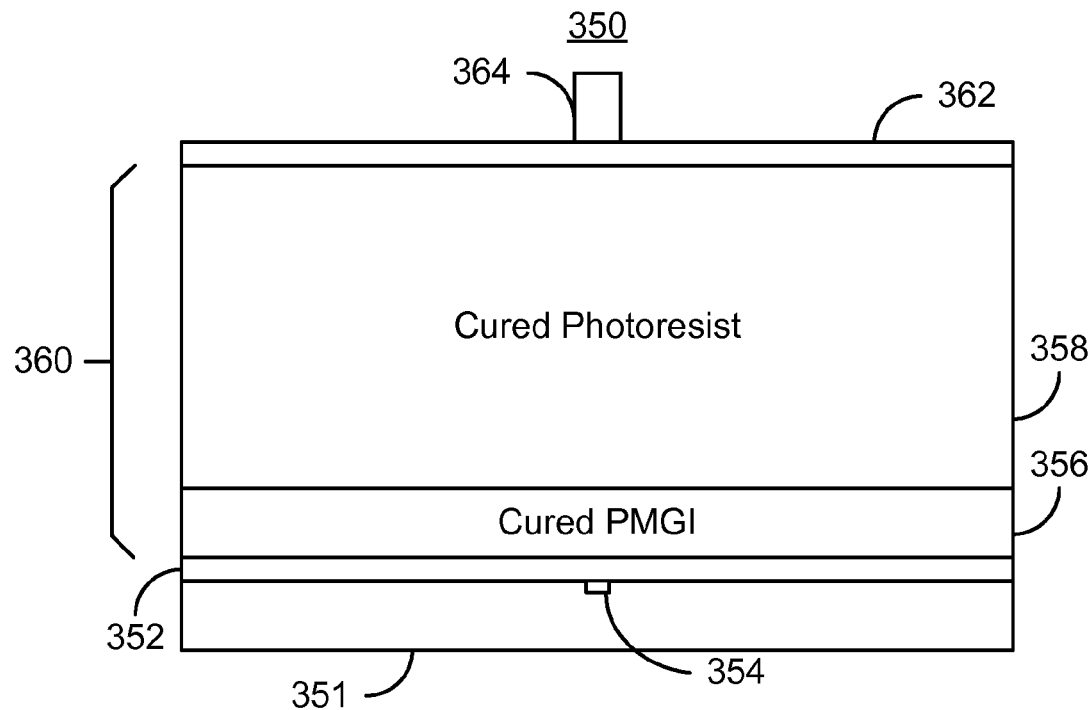
Figure 9:
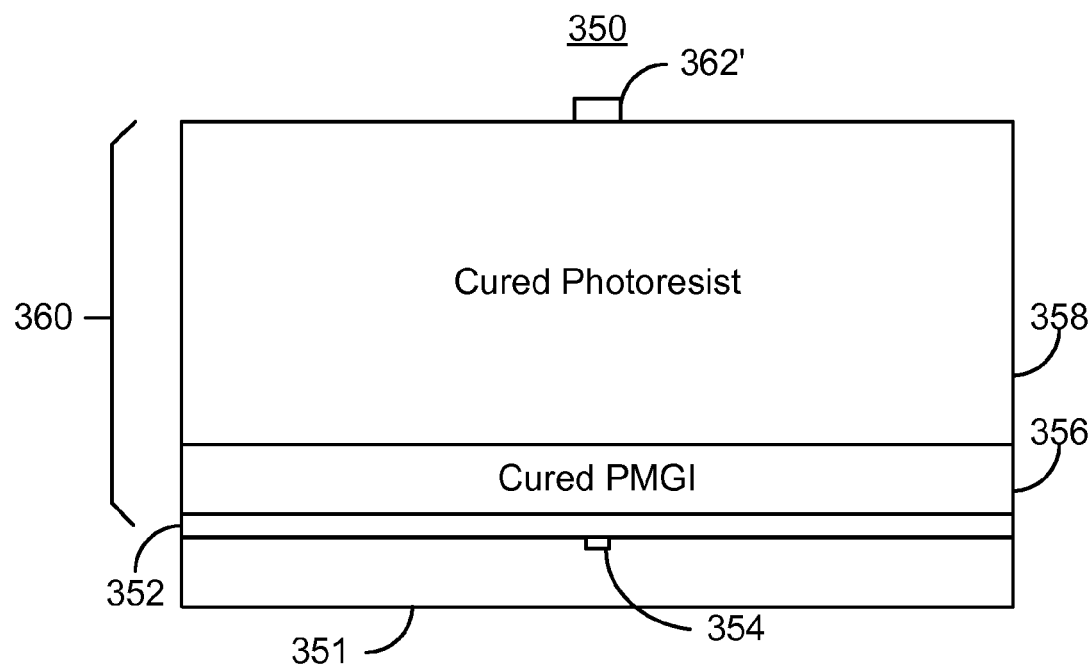

A hard mask is provided on the cured bi-layer resist film 360, via step 308. FIGS. 7-9 depict the EAMR transducer during step 308. A hard mask layer is provided as part of step 308. FIG. 7 depicts the EAMR transducer 350 after the hard mask layer 362 is provided on the cured photoresist layer 360. The hard mask layer may include materials such as Ta. A photoresist mask including an iso-line having a location and width corresponding to the desired line is then provided on the hard mask layer 362. FIG. 8 depicts the EAMR transducer 350 with photoresist mask 364. The pattern of the photoresist mask is transferred to the hard mask layer to complete step 308. In addition, any remaining photoresist mask 364 may be removed. FIG. 9 depicts the EAMR transducer 350 after step 308 is performed. Thus, a hard mask 362' corresponding to the line desired to be formed has been provided.

Figure 10:
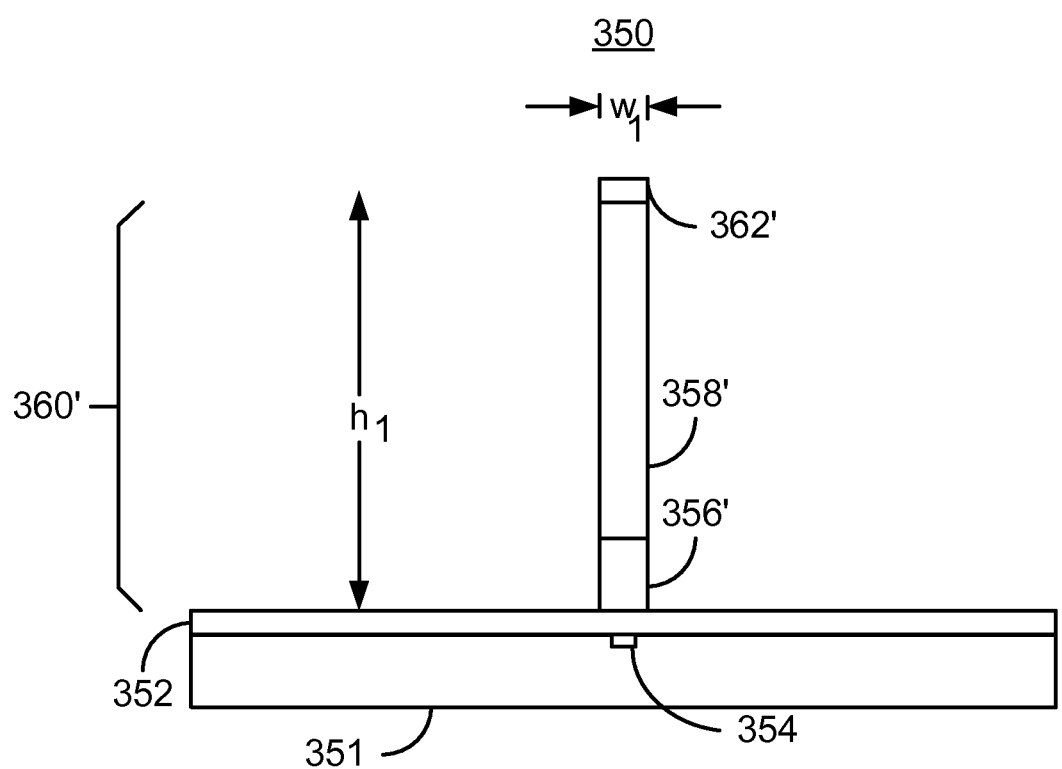

An exposed portion of the cured bi-layer resist film 360 is removed, via step 310. Thus, an isolated line may be provided. FIG. 10 depicts the EAMR transducer 350 after step 310 is performed. Thus, an isolated line 360' is provided. The line 360' includes photoresist line 358' on PMGI line 356'. The line has a height, $h_1$, and a width, $w_1$, that correspond to the desired height and width of the pole. In some embodiments the height, $h_1$ of the line may be greater than the final height of the pole. However, in other embodiments, the height of the line 360' may be on the order of the final height of the pole. Thus, the line 360' has the desired aspect ratio. Further, the line 360 may be thin. In some embodiments, the line 360' is not more than one hundred nanometers wide. Further in some embodiments, the line 360' may be at least 2.5 micrometers tall.

Figure 11:
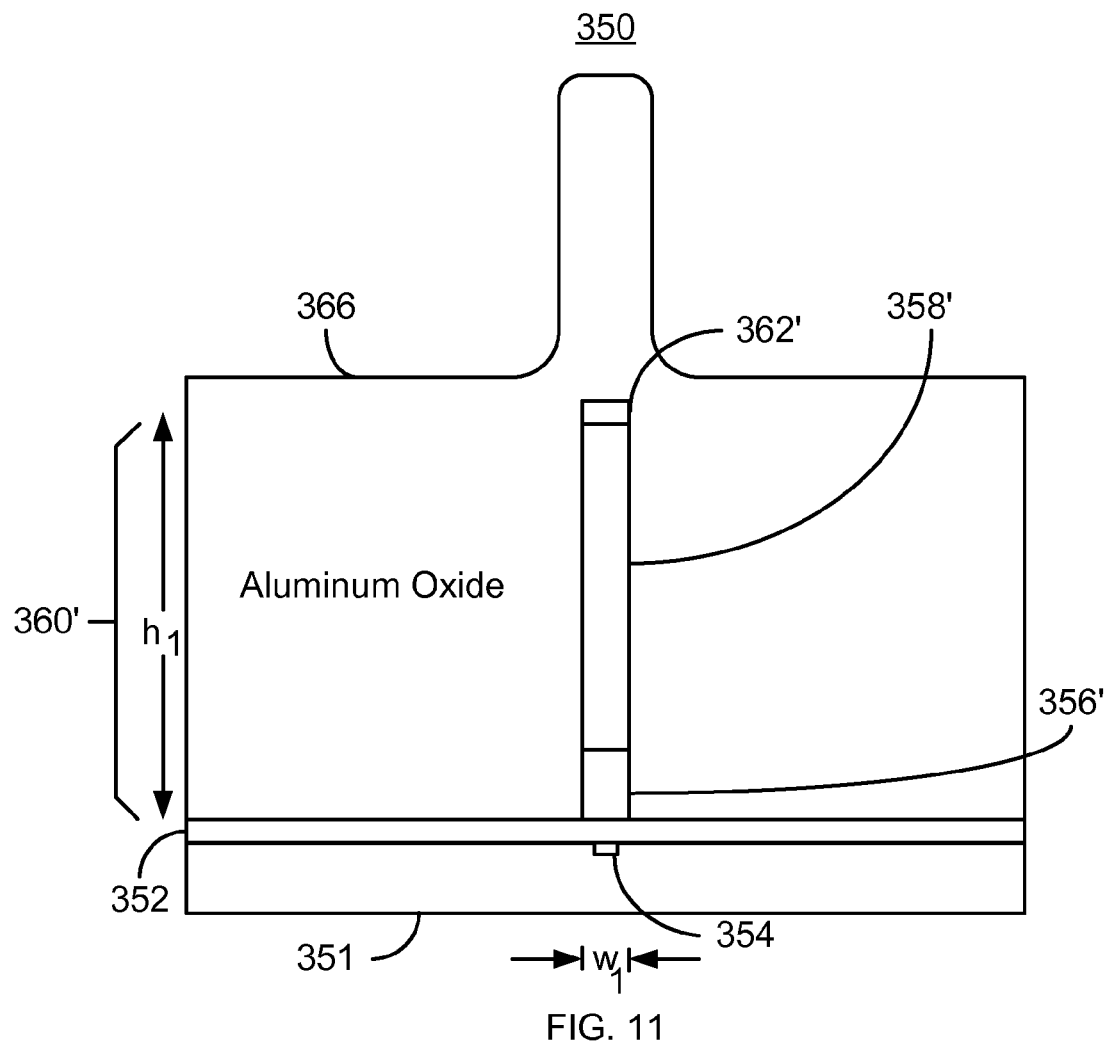
Figure 12:
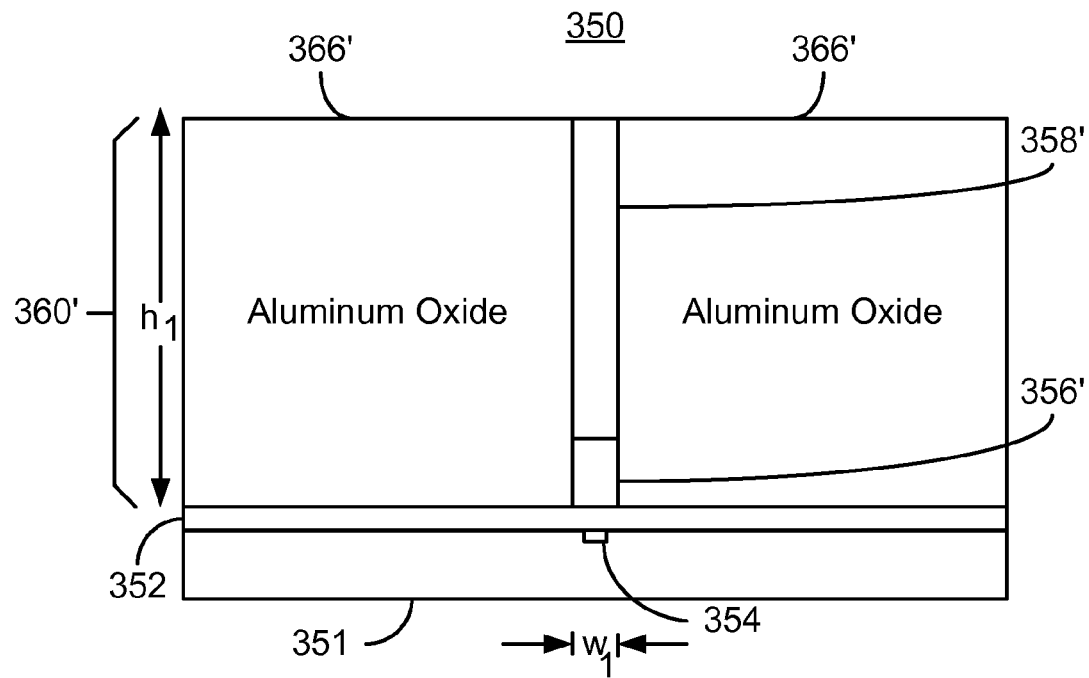

A nonmagnetic layer is deposited after the line is formed, via step 312. In some embodiments, the nonmagnetic layer is aluminum oxide. FIG. 11 depicts the EAMR transducer after step 312 has been performed. Thus, the aluminum oxide 366 layer has been deposited.

The aluminum oxide layer 366 is planarized, via step 314. FIG. 10 depicts the EAMR transducer 350 after step 314 is performed. Thus, the aluminum oxide 366' has a top that is substantially level. The top of the line 360' may be exposed.

Figure 13:
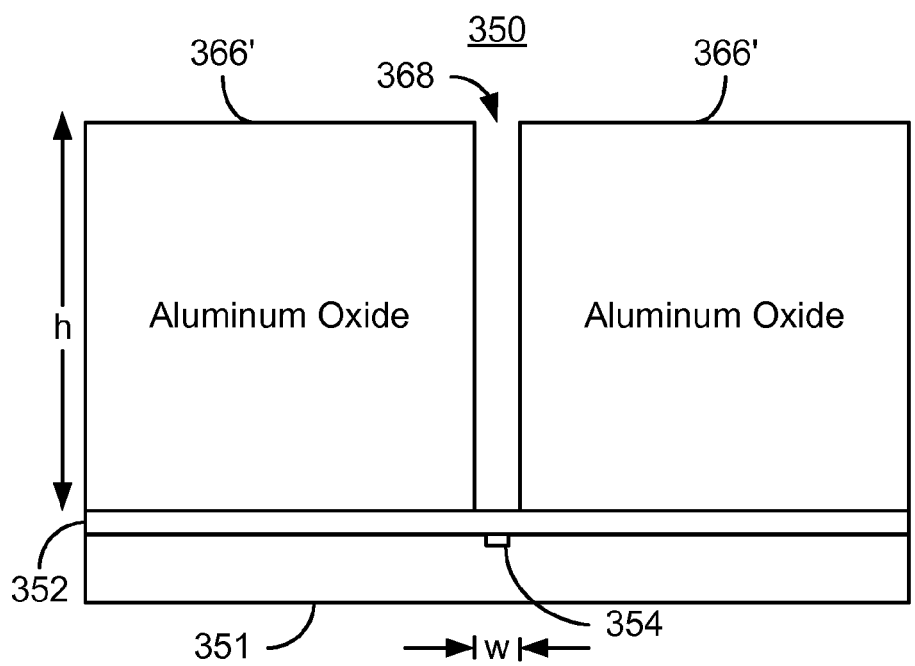

An RIE is performed, via step 316. The RIE is configured to remove the photoresist portion 358' of the line 360'. The remainder of the line is wet etched, via step 318. The wet etch is configured to remove the PMGI layer 356'. FIG. 13 depicts the EAMR transducer 350 after step 316 is performed. The line 360' has been removed, leaving trench 368 in its place. The trench 368 has a height h and width w that correspond to the height $h_1$ and width $w_1$ of the line 360'.

Figure 14:
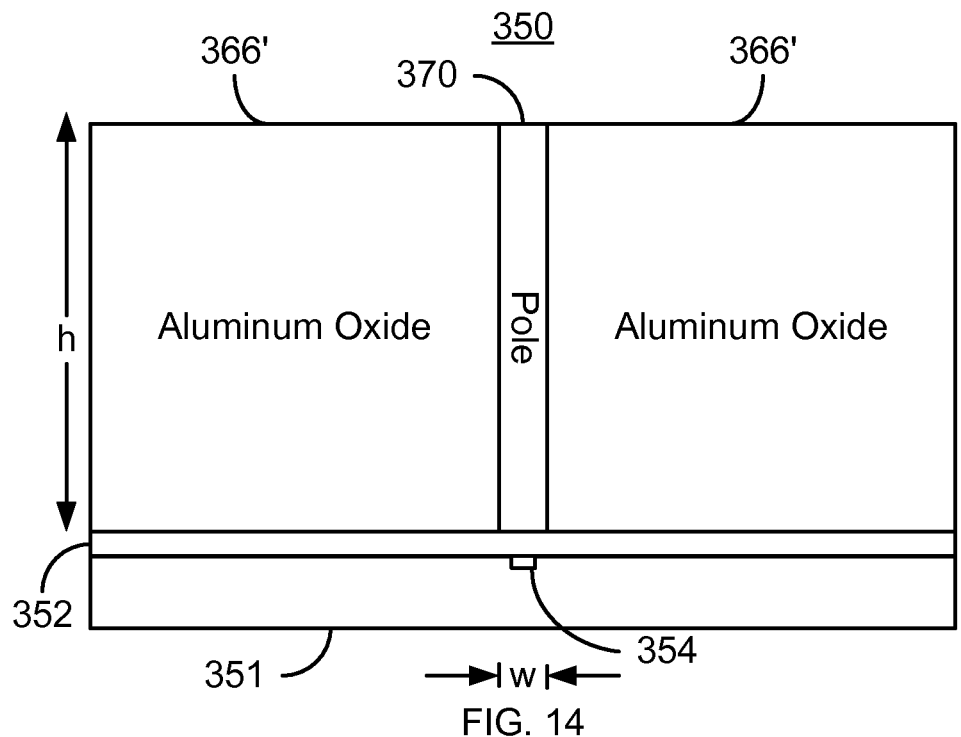

The pole layer(s) are plated in the trench 358', via step 320. In some embodiments, one or more layers may be plated. In other embodiments, a single layer may be deposited. The pole layer(s) include magnetic layers. In some embodiments, nonmagnetic layers might also be used. FIG. 14 depicts the EAMR transducer 350 after step 320 is completed. Thus, the pole 370 is shown.

Figure 15:
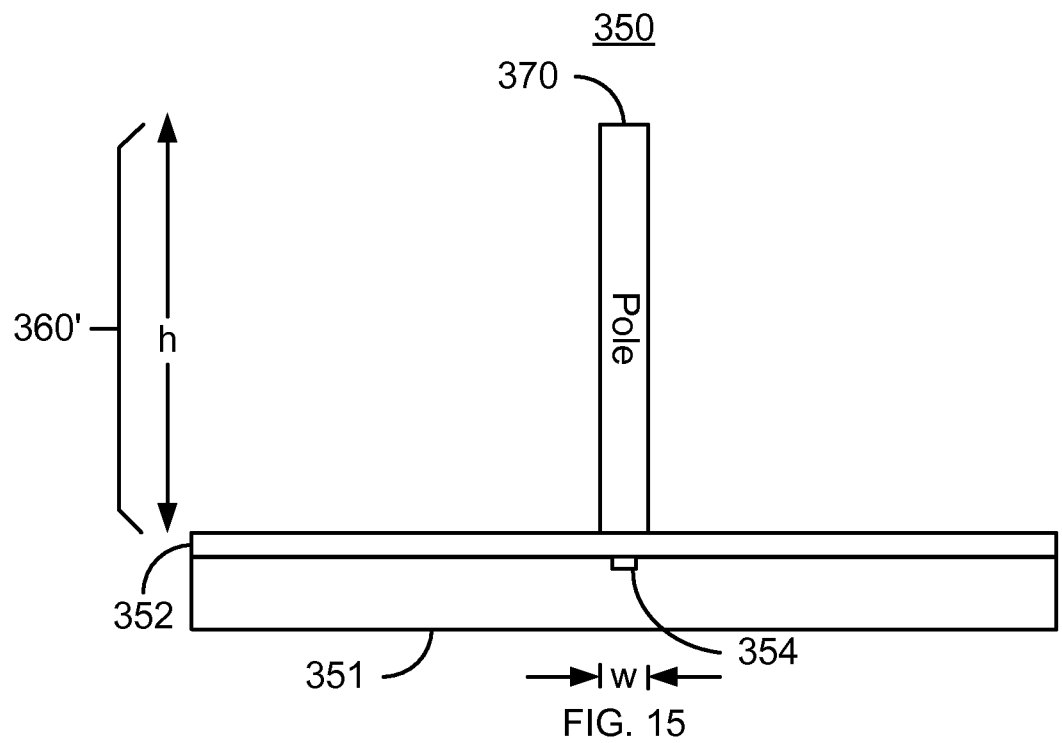

The portion of the aluminum oxide layer 366' adjacent to the pole 370 are removed, via step 322. In some embodiments, all of the aluminum oxide is removed. However, in other embodiments, only a portion of the aluminum oxide is removed. FIG. 15 depicts the EAMR transducer 350 after step 322 is performed. Thus, the pole 370 having height, h, and width, w, is formed.

Figure 16:
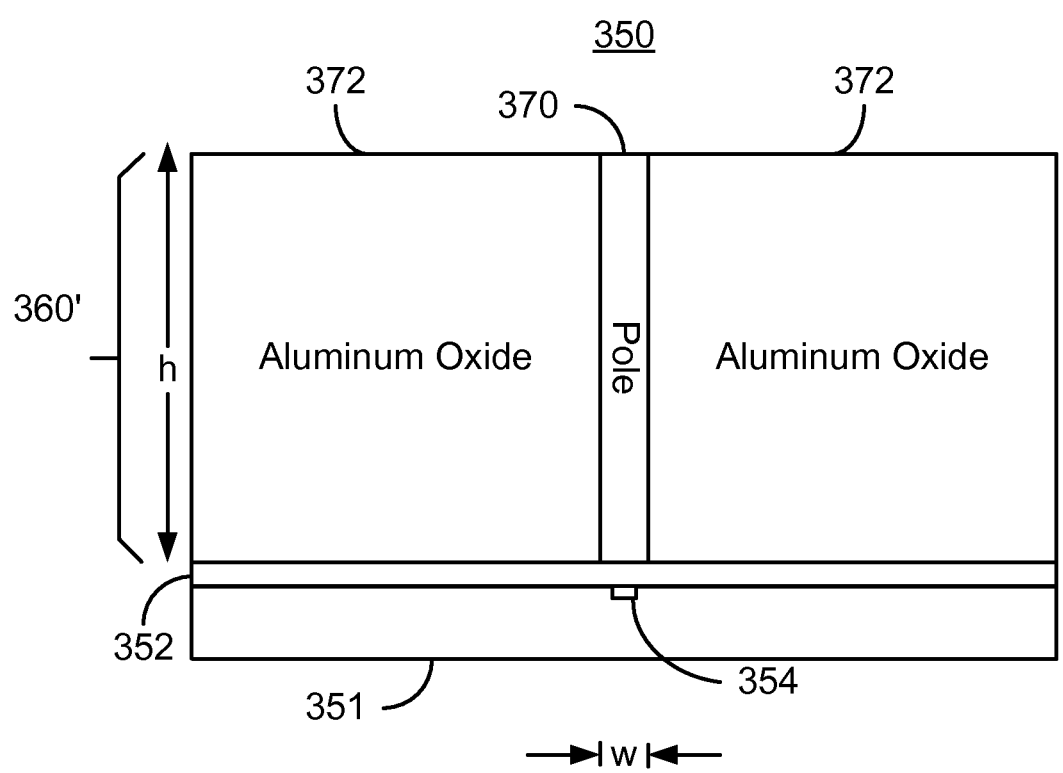

The region around the pole 370 is backfilled, via step 326. In one embodiment, step 326 includes depositing an additional layer of aluminum oxide. FIG. 16 depicts the EAMR transducer 350 after step 326 is performed. Thus, the pole 370 is shown with aluminum oxide backfill 372.

The main pole 370 is analogous to the main pole 252 shown in FIG. 4. Thus, the main pole 370 may be formed on a sloped surface. Because the resist layer 358' is self leveling, the bi-layer resist film 360 may provide a flat surface. Thus, despite the underlying sloped surface, a desired surface for photolithography is provided. Further, the PMGI layer 356 allows for the line 360' to be removed. Consequently, the pole 370 is better able to be formed. Because the method 300 is used, the line 360' is hardened by curing. The line 360' and thus the pole 370 may have a high aspect ratio. More specifically the pole height, h, divided by the width, w, may be greater than or equal to twelve. In some embodiments, the width, w, is less than or equal to one hundred nanometers. Consequently, the pole 370 having the desired width and height may also be formed. Because the pole 370 has the desired geometry, the EAMR head 250 may have enhanced performance, particularly at higher magnetic recording densities.

Figure 17:
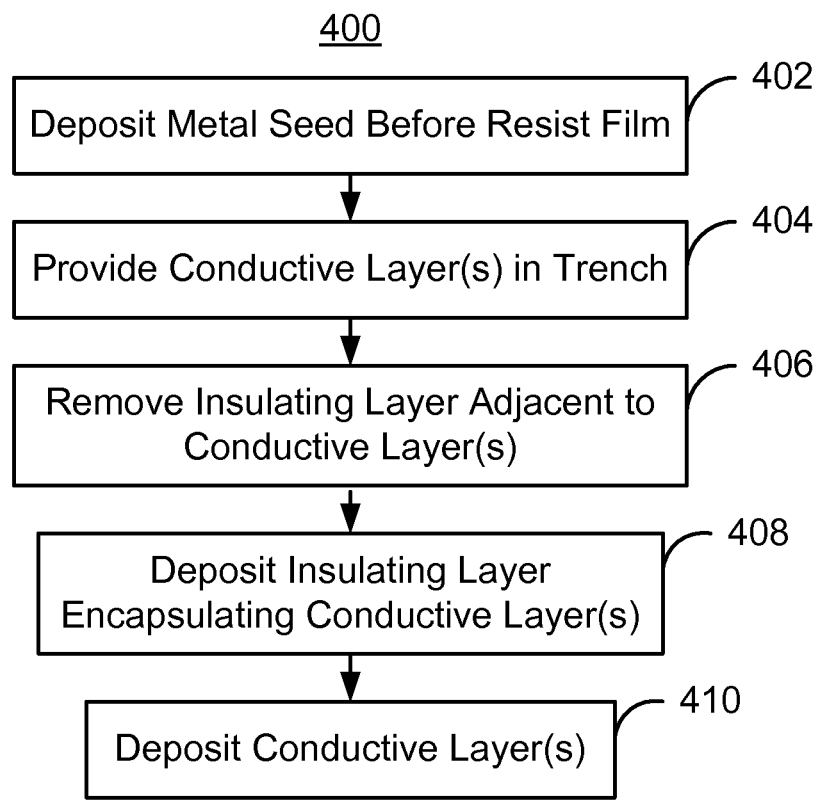
FIG. 17 is a flow chart depicting an exemplary embodiment of a method for fabricating a capacitor.

In addition to EAMR poles, other structures may be formed using the method 100. For example, in some embodiments, the method 100 may be used to form a capacitor. FIG. 17 is a flow chart depicting an exemplary embodiment of a method 400 for fabricating a capacitor. The method 400 is analogous to the step 112 of the method 100. The method 400 may thus be used in the method 100. For simplicity, some steps may be omitted and/or combined. The method 400 is described in the context of a fabricating a single structure. However, multiple transducers are generally fabricated in parallel. The method 400 is also described in the context of particular layers. However, in some embodiments, such layers may include multiple sub-layers. In one embodiment, the method 400 commences after formation of the underlayer(s) on which the structure is to reside.

A metal seed layer is deposited before the resist film of the method 100 is deposited in step, 402. Thus, a seed layer for metal deposition resides under the resist fill. Thin conductive layer(s) are deposited in the trench, via step 404. The conductive layer(s) are to form the bottom plate of the capacitor. A portion of the insulating layer adjacent to the conductive layer(s) is removed, via step 406. Thus, the conductive layer(s) at the bottom of the trench remain. An insulating layer is deposited, via step 408. The insulating layer forms the dielectric portion of the capacitor. Thus, the insulating layer encapsulates the conductive layer. Additional conductive layer(s) are deposited, via step 410.

Figure 18:
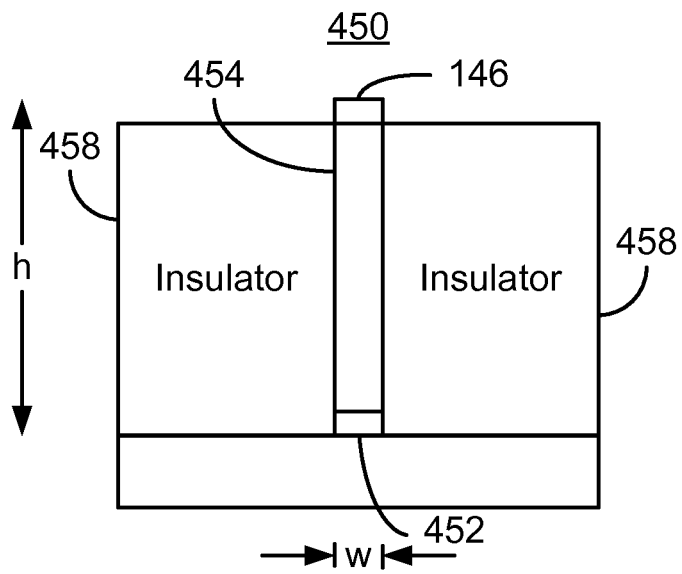
FIG. 18 is a diagram depicting an embodiment of a capacitor.

FIG. 18 is a diagram depicting an embodiment of a capacitor 450 formed using the method 400. The capacitor 450 includes plates 452 and 456 and the insulating layer 454. Also shown is insulator 458 that may be provided around the capacitor 450.

Thus, using the methods 100 and 400, the structure 450 may be formed. Because the structure is formed in a trench corresponding to the line, the structure may have a high aspect ratio. In particular, the structure may have an aspect ratio (height divided by width) that is at least ten. In some embodiments, the structure may have an aspect ratio that is greater than or equal to twelve.

We claim:

1. A method for fabricating a structure for a microelectric device comprising:
   depositing a resist film;
   curing the resist film at a temperature of at least 180 degrees centigrade to provide a cured resist film capable of supporting a line having a line height and a line width, the line height divided by the line width being an aspect ratio of at least ten;
   removing a portion of the cured resist film, a remaining portion of the resist film forming the line having the aspect ratio;
   depositing an insulating layer after the line is formed;
   removing the line to provide a trench in the insulating layer, the trench having a height and a width, the height divided by the width corresponding to the aspect ratio; and
   providing at least a portion of the structure in the trench.

2. A method for fabricating a structure for a microelectric device, wherein the structure is a capacitor, the method comprising:
   depositing a metal seed layer;
   depositing a resist film after the step of depositing the metal seed layer;
   curing the resist film at a temperature of at least 180 degrees centigrade to provide a cured resist film capable of supporting a line having an aspect ratio of at least ten;
   removing a portion of the cured resist film, a remaining portion of the resist film forming the line;
   depositing an insulating layer after the line is formed;
   removing the line to provide a trench in the insulating layer, the trench having a height and a width, the height divided by the width corresponding to the aspect ratio; providing at least a portion of the structure in the trench; and
   wherein the step of providing the at least the portion of the structure further includes providing at least one conductive layer in the trench;
   removing a portion of the insulating layer adjacent to the at least one conductive layer;
   depositing an additional insulating layer, the additional insulating layer encapsulating the at least one conductive layer; and
   depositing an additional conductive layer on the additional insulating layer.

3. The method of claim 2 wherein the step of providing the resist film further includes:
   depositing a wet-etchable layer, the wet-etchable layer also being self-leveling; and
   depositing a self-leveling layer on the wet etchable layer.

4. The method of claim 3 wherein the wet etchable layer includes polydimethylglutarimide (PMGI) and the self-leveling layer includes photoresist.

5. A method for fabricating a pole for magnetic recording transducer comprising:
   depositing a resist film;
   curing the resist film at a temperature of at least 180 degrees centigrade to provide a cured resist film capable of supporting a line having an aspect ratio of at least ten;
   removing a portion of the cured resist film, a remaining portion of the resist film forming the line;
   depositing a nonmagnetic layer after the line is formed;
   removing the line to provide a trench in the nonmagnetic layer, the trench having a height and a width, the height divided by the width corresponding to the aspect ratio;
   depositing at least one pole layer, the at least one pole layer being magnetic, a portion of the at least one pole layer residing in the trench; and
   removing a portion of the nonmagnetic layer adjacent to the at least one pole layer.

6. The method of claim 5 wherein the height of the trench is at least twelve times the width.

7. The method of claim 5 wherein the line is at least 2.5 micrometers tall.

8. The method of claim 5 wherein the temperature is at least two hundred degrees.

9. The method of claim 8 wherein the temperature is not more than two hundred forty degrees centigrade.

10. The method of claim 5 wherein the nonmagnetic layer includes aluminum oxide.

11. The method of claim 5 wherein the step of removing the line further includes:
    planarizing the nonmagnetic layer;
    reactive ion etching the line.

12. The method of claim 11 wherein the step of removing the line further includes:
    wet etching a remaining portion of the line.

13. The method of claim 5 wherein the magnetic recording transducer is an energy assisted magnetic recording (EAMR) transducer.

14. A method for fabricating a pole for magnetic recording transducer comprising:

depositing a polydimethylglutarimide (PMGI) layer on a seed layer residing on a sloped surface;

depositing a photoresist layer on the PMGI layer, the PMGI layer and the photoresist layer forming a bi-layer resist film;

curing the bi-layer resist film at a temperature of at least 200 degrees centigrade to provide a cured resist film capable of supporting a line having an aspect ratio of at least twelve, the cured resist film being at least 2.5 micrometers tall;

providing a hard mask on the cured resist film, the hard mask covering a portion of the cured resist film corresponding to the line;

removing a portion of the cured resist film exposed by the hard mask, a remaining portion of the resist film forming the line;

depositing an aluminum oxide layer after the line is formed;

planarizing the aluminum oxide layer;

reactive ion etching a portion of the line corresponding to the photoresist layer;

wet etching the line, providing a trench in the aluminum oxide layer corresponding to the line;

plating at least one pole layer, the at least one pole layer being magnetic, a portion of the at least one pole layer residing in the trench and having a height and a width, the height being at least twelve times the width;

removing a portion of the nonmagnetic layer adjacent to the at least one pole layer;

removing a portion of the seed layer exposed by the pole; and performing an aluminum oxide backfill.

* * * * *